United States Patent
Domeck

(10) Patent No.: US 11,130,507 B2
(45) Date of Patent: Sep. 28, 2021

(54) LINEAR-MOTION BRAKE SYSTEM

(71) Applicant: Todd Domeck, Lahaina, HI (US)

(72) Inventor: Todd Domeck, Lahaina, HI (US)

(*) Notice: Subject to any disclaimer, the term of this patent is extended or adjusted under 35 U.S.C. 154(b) by 0 days.

(21) Appl. No.: 16/264,288

(22) Filed: Jan. 31, 2019

(65) Prior Publication Data

US 2019/0232985 A1 Aug. 1, 2019

Related U.S. Application Data

(60) Provisional application No. 62/624,521, filed on Jan. 31, 2018.

(51) Int. Cl.
| | |
|---|---|
| *F16D 63/00* | (2006.01) |
| *B61H 9/02* | (2006.01) |
| *B61H 9/06* | (2006.01) |

(52) U.S. Cl.
CPC ............... *B61H 9/02* (2013.01); *B61H 9/06* (2013.01); *F16D 63/008* (2013.01)

(58) Field of Classification Search
CPC ........... B61H 9/02; B61H 9/06; F16D 63/008; B61B 12/028; A63G 21/22
See application file for complete search history.

(56) References Cited

U.S. PATENT DOCUMENTS

| | | | | |
|---|---|---|---|---|
| 3,949,842 A | * | 4/1976 | Kiehn | F16D 59/02 188/189 |
| 6,666,773 B1 | * | 12/2003 | Richardson | F16D 63/008 472/49 |
| 8,025,131 B1 | * | 9/2011 | Boren | A63G 21/22 188/165 |
| 9,033,115 B2 | * | 5/2015 | Lerner | B61H 9/02 188/62 |
| 9,499,181 B2 | * | 11/2016 | Halliday | B61H 9/02 |
| 9,669,319 B2 | * | 6/2017 | Cylvick | A63G 21/20 |
| 2007/0039788 A1 | * | 2/2007 | Fulton | H02K 49/04 188/164 |

* cited by examiner

*Primary Examiner* — Xuan Lan Nguyen

(57) ABSTRACT

A linear-motion brake system uses a fixed block, a moving block, and a linear-motion resistance assembly to decelerate a user who is tethered to the system via a force-transfer line. The linear-motion resistance assembly is a compressible component that exerts a force on the force-transfer line that opposes the force generated by the user traveling along a zipline. The moving block and the fixed block are positioned on opposite sides of the linear-motion resistance assembly, such that the moving block compresses the linear-motion resistance assembly when impelled by the force-transfer line. The force transfer line is threaded through a pair of guide channels that run along the linear-motion resistance assembly. One end of the force-transfer line is tethered to the fixed block while the opposite end is tethered to the user. Thus, the user's motion is transferred to the moving block and resisted by the linear-motion resistance assembly.

1 Claim, 3 Drawing Sheets

LINEAR-MOTION BRAKE SYSTEM

The current application claims a priority to the U.S. Provisional Patent application Ser. No. 62/624,521 filed on Jan. 31, 2018.

FIELD OF THE INVENTION

The present invention generally relates to a braking device. More specifically the present invention is designed to decelerate a moving rider or an object, by creating a mechanical advantage that provides an increased braking distance with a reduced impact force.

BACKGROUND OF THE INVENTION

Action sports often require complex safety equipment to ensure users are protected at all times. Zip-lining for example, is a transport method typically comprising of a high strength cable fixated at two points, which allows people to descend inclines at increased rates of speed. Furthermore, ziplines are used for various purposes, including recreational rides, transportation systems or utilitarian tasks such as rescue operations. Zip-line systems are still common in some areas of the world where infrastructure is underdeveloped, or certain areas are inaccessible via traditional routes. More recently zip-lining has become a popular way of enjoying outdoor activities, in a safe and controlled environment.

Depending on the environment where the zip-line system is installed and the incline gradient, various components are further integrated into the design, to ensure the device operates safely. In steeper applications where the angle of incline is more drastic, a braking system is commonly added. The braking system allows the operators to manipulate the rate of descent and ensure the speed with which users decelerate at the end of line is a safe and controlled. The g-forces caused by experiencing sudden deceleration can potentially cause catastrophic injuries to internal organs, and even death. The present invention aims to solve some of these problems by disclosing a braking system designed to decelerate a rider or an object at a steady pace while still allowing the rider or object to be transported to the end of the zipline with no braking system on the line to encumber the objects path.

DETAIL DESCRIPTIONS OF THE INVENTION

All illustrations of the drawings are for the purpose of describing selected versions of the present invention and are not intended to limit the scope of the present invention.

Figure 1:
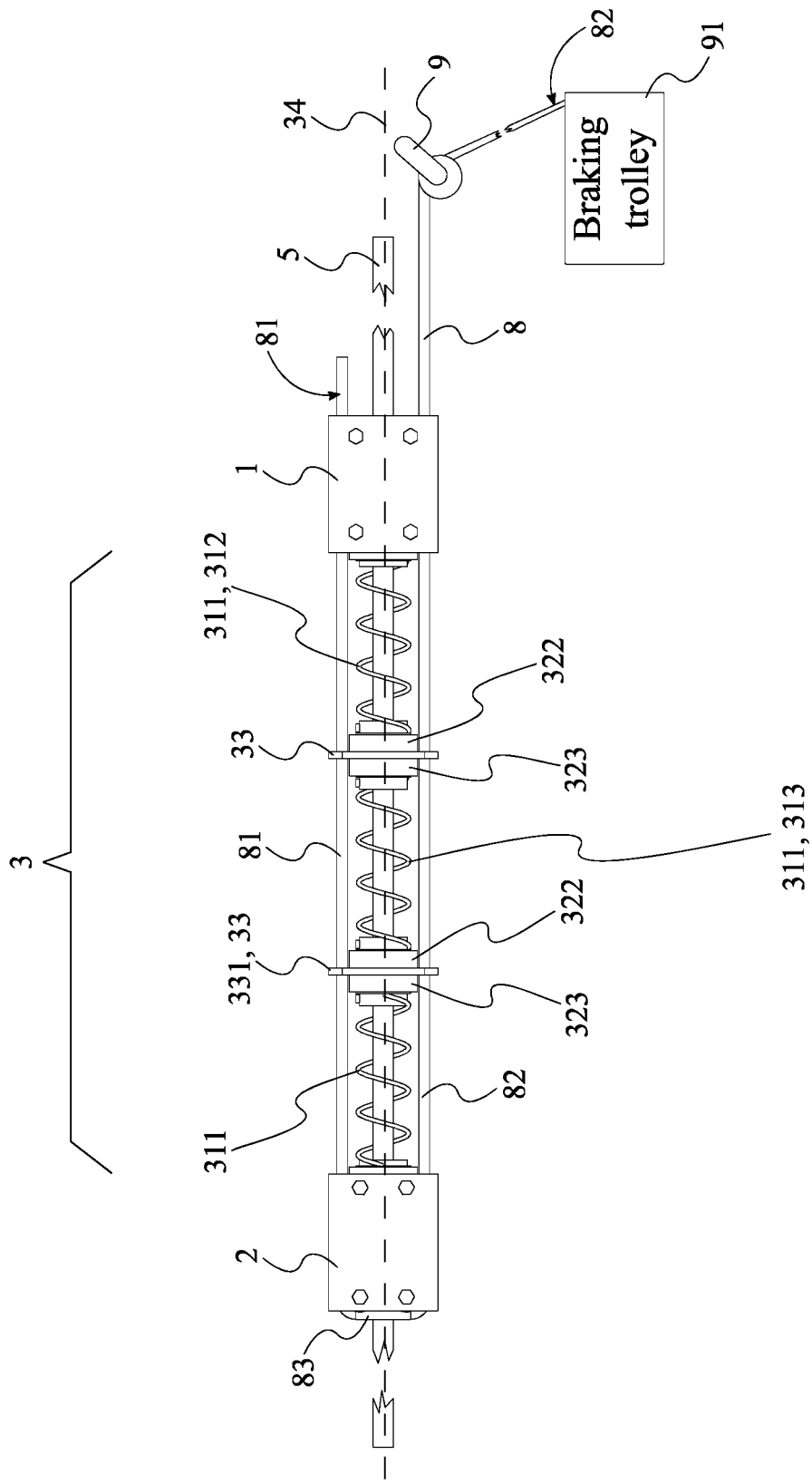
FIG. 1 is side view of the present invention.
Figure 2:
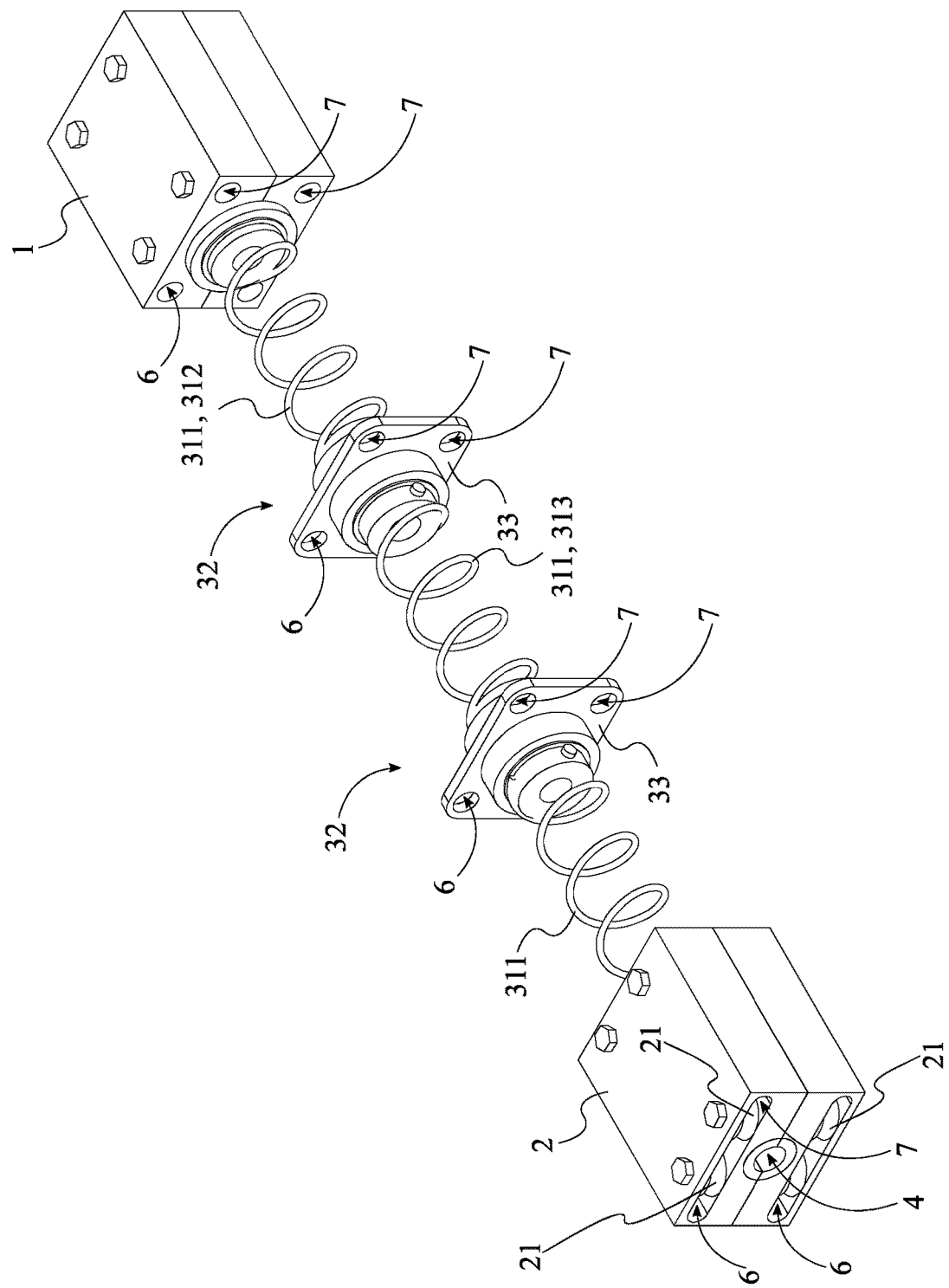
FIG. 2 is an isometric perspective view of the present invention with the braking track and the force-transfer line removed.
Figure 3:
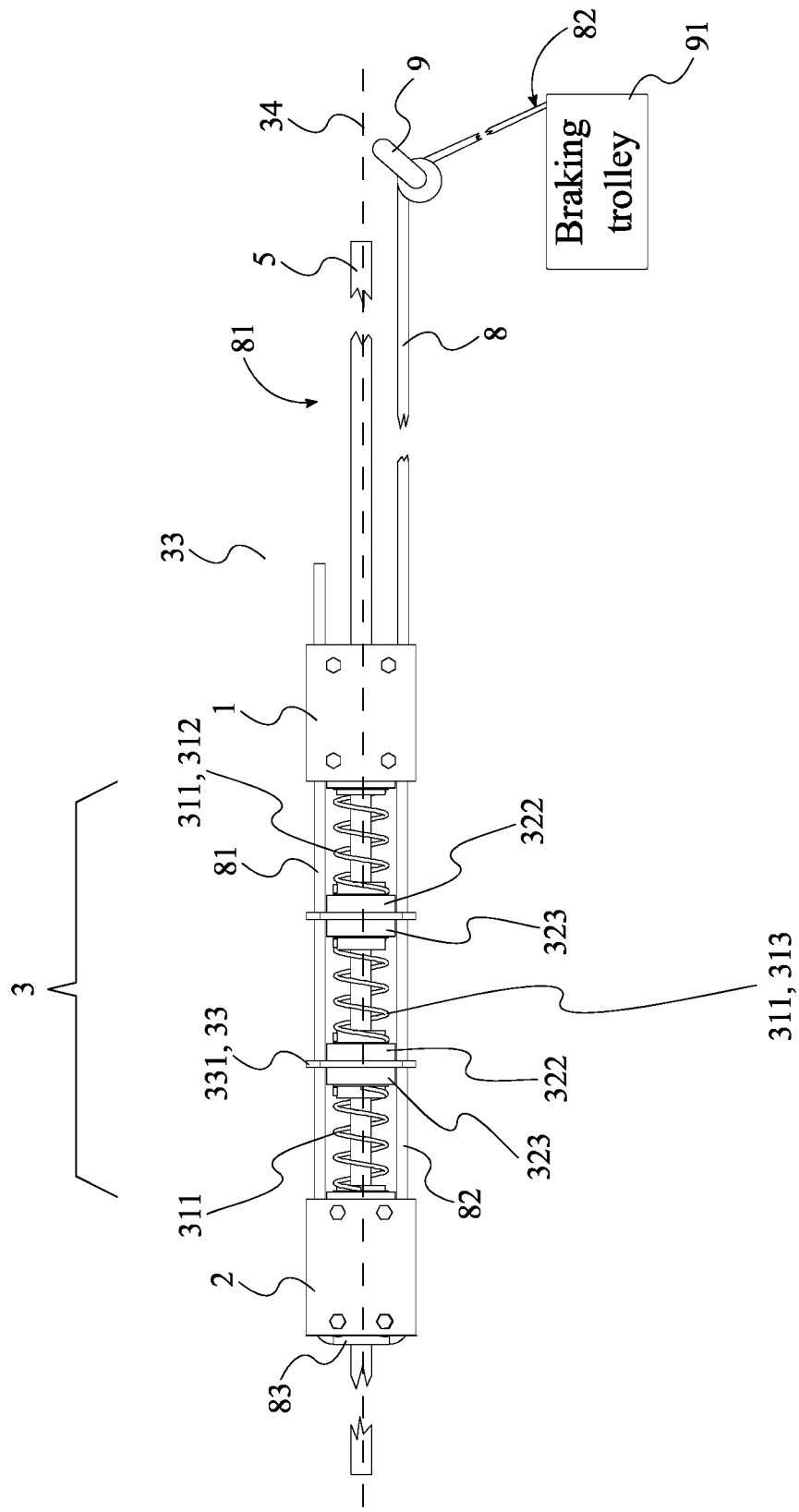
FIG. 3 is side view of the present invention in a compressed configuration.

Referring to FIG. 1 through FIG. 3, the present invention, the linear-motion brake system, is an apparatus that makes use of a compressible assembly to resist linear displacement. Preferably, the present invention is a braking system that is used to decelerate a user who is traveling along a zipline. However, the present invention can be adapted to provide a force that resists linear displacement for multiple applications. Additionally, the present invention makes use of a pulley assembly to mechanically enhance the braking potential of the compressible assembly. The overall system functions thus, a braking line is tripped when the user enters a predetermined braking zone while traveling along the zipline. This braking line is connected in between the user, the pulley assembly, and the compressible member. The pulley assembly enables forces exerted on the braking line to be transferred to the compressible assembly. Thus, causing the compressible assembly to be compressed along a longitudinal axis. A proportional length of the braking line is payed out as the compression assembly decreases in size along the longitudinal axis. This enables the present invention to decelerate the user at a rate which reduces injury and trauma.

Referring to FIG. 1 and FIG. 2, to achieve the above-described functionality, the present invention comprises at least one fixed block 1, at least one moving block 2, at least one linear-motion resistance assembly 3, at least one track hole 4, at least one first guide channel 6, at least one second guide channel 7, at least one braking track 5, and at least one force-transfer line 8. The fixed block 1 is a rigid structure that is anchored in place at one end of the compressible assembly. The moving block 2 is a rigid structure that is positioned on the end of the compressible assembly opposite to the fixed block 1. The linear-motion resistance assembly 3 is designed to resist linear displacement of the user when the user approaches an end of the zipline. To that end, the linear-motion resistance assembly 3 is connected in between the fixed block 1 and the moving block 2. Accordingly, the linear-motion resistance assembly 3 produces a force that resists moving the moving block 2 toward the fixed block 1 along a longitudinal axis 34 of the linear-motion resistance assembly 3. In an alternative embodiment, the linear-motion resistance assembly 3 is designed to produce a force that resists moving the moving block 2 away from the fixed block 1 along the longitudinal axis 34 of the linear-motion resistance assembly 3.

Referring to FIG. 1 and FIG. 2, the present invention is designed to function as a linear system. To that end that the track hole 4 traverses through the fixed block 1, the linear-motion resistance assembly 3, and the moving block 2. Additionally, the track hole 4 is oriented parallel to the longitudinal axis 34 of the linear-motion resistance assembly 3. Further, the braking track 5 is mounted within the track hole 4. Moreover, the moving block 2 and the linear-motion resistance assembly 3 are slidably engaged along the braking track 5. As a result, the path of moving block 2 and the linear-motion resistance assembly 3 is defined by the braking track 5. The fixed block 1 is fixedly attached to the braking track 5 such that the fixed block 1 acts as a stop which limits the distance that the moving block 2 can be displaced along the braking track 5 when moving toward the fixed block 1. As such, the moving block 2 and the fixed block 1 form a clamp which begins compressing the linear-motion resistance assembly 3 when the user trips the braking line by entering braking zone of the zipline.

Referring to FIG. 1 and FIG. 2, as described above, the present invention makes use of the braking line to transfer movement of the user into the moving block 2. To accomplish this, the present invention makes use of guide channels to ensure the line remains untangled and to facilitate efficient force transfer. Specifically, the first guide channel 6 is mounted adjacent to the fixed block 1, the linear-motion resistance assembly 3, and the moving block 2. Additionally, the second guide channel 7 is mounted adjacent to the fixed block 1, the linear-motion resistance assembly 3, and the moving block 2. Further, the first guide channel 6 and the second guide channel 7 are oriented parallel to the longitudinal axis 34 of the linear-motion resistance assembly 3. As a result, the first guide channel 6 and the second guide channel 7 form tracks that retain the force-transfer line 8 in a sufficiently linear configuration. Preferably, the first guide channel 6 is positioned opposite to the second guide channel 7 across the fixed block 1, the linear-motion resistance assembly 3, and the moving block 2. Thus positioned, the first guide channel 6 and the second guide channel 7 facilitate a balanced distribution of forces. The force transfer line functions as the braking line and is threaded through the first guide channel 6 and the second guide channel 7. Additionally, a first end of the force-transfer line 8 is tethered to the fixed block 1. Consequently, the fixed block 1 functions as an anchor point for the first end of the force-transfer line 8 while a second end is connected to the user within the braking zone of the zipline. Thus, the first guide channel 6 and the second guide channel 7 form tracks through which the force-transfer line 8 passes as the moving block 2 is pressed toward the fixed block 1.

Referring to FIG. 1 and FIG. 2, the linear-motion resistance assembly 3 is designed to be a modular system with a length that can be adjusted to fit a desired application. To achieve this functionality, the linear-motion resistance assembly 3 comprises a plurality of compression members 311 and a plurality of spacers 32. Preferably, each of the plurality of compression members 311 is a compression spring. Alternative embodiments of the present invention are designed to use hydraulic cylinders linear actuators and rubber or foam as the plurality of compression members 311. The plurality of compression members 311 is serially distributed along the braking track 5. As a result, the position of the moving block 2 is directly correlated to a length of each of the plurality of compression members 311. A corresponding spacer from the plurality of spacers 32 is mounted in between each of the plurality of compression members 311. Thus positioned, the plurality of spacers 32 retains the plurality of compression members 311 in a desired orientation, which facilitates linear compression.

Referring to FIG. 1, FIG. 2, and FIG. 3, the plurality of spacers 32 is designed to maintain the plurality of compression members 311 in a serial configuration. To achieve this functionality, each of the plurality of spacers 32 comprises a first retention mechanism 322 and a second retention mechanism 323. The first retention mechanism 322 is connected adjacent to the second spring-retention mechanism. Additionally, the track hole 4 traverses through the first retention mechanism 322 and the second retention mechanism 323. Further, an arbitrary member 312 is connected to the first retention mechanism 322, wherein the arbitrary member 312 is from the plurality of compression members 311. Moreover, an adjacent member 313 is connected to the first retention mechanism 322, wherein the adjacent member 313 is from the plurality of compression members 311. As a result, each pair of compression members 311 is connected by the corresponding spacer. Preferably, the first retention mechanism 322 and the second retention mechanism 323 are detachable fasteners that function as mounts for the ends of the plurality of compression members 311. The linear-motion resistance assembly 3 further comprises a plurality of guide plates 33. A corresponding plate 331 from the plurality of guide plates 33 is connected in between the first guide channel 6, the second guide channel 7, and each of the plurality of spacers 32. That is, the plurality of guide plates 33 forms the webbing that extends between the guide channels and the linear-motion resistance assembly 3.

Referring to FIG. 1, FIG. 2, and FIG. 3, the present invention is designed to function effectively decelerate the user entering the braking zone at high velocities. To facilitate this, the present invention further comprises at least one sheave 21. The sheave 21 is mounted adjacent to the moving block 2, opposite to the linear-motion resistance assembly 3. Thus positioned, the sheave 21 prevents the force-transfer line 8 from rubbing against the moving block 2. More specifically, a first portion 81 of the force-transfer line 8 is positioned within the first guide channel 6. Additionally, a second portion 82 of the force-transfer line 8 is positioned within the second guide channel 7. Finally, an intermediary portion 83 of the force-transfer line 8 is looped over the sheave 21. Accordingly, the force transfer line is retained in a configuration that facilitates pressing the moving block 2 against the linear-motion resistance member when decelerating the user. In an alternative embodiment of the present invention, the second portion 82 of the force-transfer line 8 is not threaded through the second guide channel 7. In this embodiment, the second portion 82 of the force-transfer line 8 is threaded through a redirect pulley. The redirect pulley maintains the second portion 82 of the force-transfer line 8 in an orientation that facilitates moving the moving block 2 toward the fixed block 1. In a separate alternative embodiment, the first end of the force transfer line is tethered to the moving block 2. In this embodiment, only the first portion 81 of the force-transfer line 8 is threaded through the first guide channel 6, such that the force generated by the moving user is directly transferred to the moving block 2 and used to compress the linear-motion resistance assembly 3.

Referring to FIG. 1, FIG. 2, and FIG. 3, the present invention is designed to be adapted to work with zipline systems with varying configurations. To facilitate this, the present invention comprises at least one pulley 9 and at least one braking trolley 91. The pulley 9 is engaged along the force-transfer line 8. Additionally, the pulley 9 is positioned in between the fixed block 1 and a second end of the force-transfer line 8. Thus positioned, the pulley 9 enables the force-transfer line 8 to be redirected toward an application-specific end. That is, the pulley 9 enables the force transfer line to be bent and then connected to the user regardless of the user's position relative to the fixed block 1. The braking trolley 91 is a coupling device that runs along the length of the zipline. Additionally, the second end of the force-transfer line 8 is tethered to the braking trolley 91. As a result, when the user enters the braking zone the braking trolley 91 becomes displaced. This displacement exerts a force on the force-transfer line 8. The force-transfer line 8 then moves the moving block 2 toward the fixed block 1. This displacement of the moving block 2 along the braking track 5 causes the linear-motion resistance assembly 3 to become compressed. Accordingly, the linear-motion resistance assembly 3 exerts a counterforce, which decelerates the user. Preferably, the braking track 5 is a cable that is fixed at both ends. Alternatively, the braking track 5 is a rigid body that causes the moving block 2 and the linear-motion resistance assembly 3 to travel along paths of varying shape and size.

Although the invention has been explained in relation to its preferred embodiment, it is to be understood that many other possible modifications and variations can be made without departing from the spirit and scope of the invention as hereinafter claimed.

What is claimed is:

1. A linear-motion brake system comprising:
at least one fixed block;
at least one moving block;

at least one linear-motion resistance assembly;
at least one track hole;
at least one braking track;
at least one first guide channel;
at least one second guide channel;
at least one force-transfer line;
a braking trolley;
at least one pulley;
at least one sheave;
the linear-motion resistance assembly being connected in between the fixed block and the moving block;
the track hole traversing through the fixed block, the linear-motion resistance assembly and the moving block;
the braking track being mounted within the track hole;
the moving block and the linear-motion resistance assembly being slidably engaged along the braking track;
the first guide channel traversing through the fixed block, the linear-motion resistance assembly and the moving block;
the second guide channel traversing through the fixed block, the linear-motion resistance assembly and the moving block;
the first guide channel, the second guide channel and the track hole being oriented parallel to a longitudinal axis of the linear-motion resistance assembly;
the force-transfer line being threaded through the first guide channel and the second guide channel;
the at least one pulley being engaged along the force-transfer line;
the force-transfer line comprising a first end, a second end, a first portion, a second portion and an intermediary portion;
the first end being tethered to the fixed block;
the second end being tethered to the braking trolley;
the pulley being positioned in between the fixed block and the second end;
the first portion, the second portion and the intermediary portion being formed in between the first end and the second end;
the first portion being formed in between the first end and the intermediary portion;
the intermediary portion being formed in between the first portion and the second portion;
the second portion being formed in between the intermediary portion and the second end;
the first portion being threaded through the first guide channel;
the second portion being threaded through the second guide channel;
the at least one sheave being mounted within the moving block;
the intermediary portion being looped over the at least one sheave;
the linear-motion resistance assembly comprising a plurality of compression members and a plurality of spacers;
the plurality of compression members being serially distributed along the braking track;
a corresponding spacer among the plurality of spacers being mounted in between two corresponding adjacent compression members among the plurality of compression members;
wherein each of the plurality of compression members is a spring;
each of the plurality of spacers comprising a first retention mechanism, a second retention mechanism and a guide plate, the guide plate being connected in between the first retention mechanism and the second retention mechanism, the track hole, the first guide channel and the second guide channel traversing through the first retention mechanism, the second retention mechanism and the guide plate, an arbitrary member among the plurality of compression members being connected to the first retention mechanism, an adjacent member among the plurality of compression members being connected to the second retention mechanism; and
wherein the braking track is a cable.

* * * * *